US012725616B1

(12) United States Patent
Ahmad et al.

(10) Patent No.: US 12,725,616 B1
(45) Date of Patent: Sep. 1, 2026

(54) SYSTEMS AND METHODS TO GENERATE A NOTE BASED ON UTTERANCES IN DIFFERENT LANGUAGES

(71) Applicant: Suki AI, Inc., Redwood City, CA (US)

(72) Inventors: Feroz Ahmad, Sunnyvale, CA (US); Siddharth Sharma, Gurugram (IN); Belwadi Srikanth, Santa Clara, CA (US); Jagruti Joshi, Ahmedabad (IN)

(73) Assignee: Suki AI, Inc., Redwood City, CA (US)

( * ) Notice: Subject to any disclaimer, the term of this patent is extended or adjusted under 35 U.S.C. 154(b) by 329 days.

(21) Appl. No.: 18/499,068

(22) Filed: Oct. 31, 2023

(51) Int. Cl.
*G10L 15/26* (2006.01)
*G10L 15/22* (2006.01)

(52) U.S. Cl.
CPC .............. *G10L 15/26* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 8,886,517 | B2 * | 11/2014 | Soricut | G06F 40/51 704/2 |
| 2017/0011740 | A1 * | 1/2017 | Gauci | G06F 40/169 |
| 2020/0042602 | A1 * | 2/2020 | Anderson | G06F 3/167 |
| 2020/0125928 | A1 * | 4/2020 | Doyle | G06N 3/08 |
| 2021/0375414 | A1 * | 12/2021 | Amir | G06Q 50/00 |
| 2022/0044812 | A1 * | 2/2022 | Barnes | G16H 50/20 |
| 2023/0153530 | A1 * | 5/2023 | Savkov | G06N 3/084 704/9 |
| 2023/0274730 | A1 * | 8/2023 | Fantinuoli | G06N 7/01 |
| 2023/0334763 | A1 * | 10/2023 | Reicher | G06T 15/40 |
| 2024/0320443 | A1 * | 9/2024 | Moturi | G06F 40/30 |
| 2024/0428020 | A1 * | 12/2024 | Wu | G10L 21/00 |
| 2025/0078574 | A1 * | 3/2025 | Thomson | G06F 40/58 |
| 2025/0140404 | A1 * | 5/2025 | Dua | G16H 50/20 |

* cited by examiner

*Primary Examiner* — Neeraj Sharma
(74) *Attorney, Agent, or Firm* — Esplin & Associates, PC

(57) ABSTRACT

Systems and methods to generate a note based on utterances in different languages are disclosed. Exemplary implementations may: obtain, in an ongoing manner, individual audio segments that represent sounds captured by the client computing platform during a conversation session between a caregiver and a subject in which the caregiver speaks primarily in a caregiver language and the subject speaks primarily in a subject language that is different than the caregiver language; perform, upon obtainment of individual ones of the audio segments, a first translation on the individual audio segments to generate individual translated segments; effectuate presentation of the individual translated segments extemporaneous with the conversation session to facilitate understanding between the caregiver and the subject; perform a second translation on the audio segments based on a note language to determine content blocks in the note language; and populate at least some of a note with the content blocks.

20 Claims, 3 Drawing Sheets

SYSTEMS AND METHODS TO GENERATE A NOTE BASED ON UTTERANCES IN DIFFERENT LANGUAGES

FIELD OF THE DISCLOSURE

The present disclosure relates to systems and methods to generate a note based on utterances that are in different languages during a conversation session, and effectuate translation segments extemporaneous to the conversation session to facilitate understanding between participants of the conversation session.

BACKGROUND

During conversation sessions amongst two or more parties, such as subject visits with caregivers, languages spoken may be different amongst the speakers. Furthermore, documentation of the visits may be in a language that is different than the languages spoken by the speakers.

SUMMARY

One aspect of the present disclosure relates to a system configured to generate a note based on utterances in different languages. During a conversation session amongst participants, the participants may speak a language that they are comfortable in. The languages spoken in the conversation session may all be different. As each participant speaks, audio segments that represent and convey their utterances may be translated to the language(s) of the other participants and presented to the other participants to facilitate understanding and progress of the conversation session. Additionally, based on the audio segments and a note language that may be different than the languages of the participants, a second translation may occur to generate content blocks in the note language based on the audio segments, so that a note that documents the conversation session may be generated in the note language.

As such, the system provides an improvement to technical fields of textual content generation as well as translation as the system enables real-time translation for communication and may generate swift textual documentation based on utterances in multiple languages. Such system may reduce processing time and improve accuracy of translation for generating notes variations of a note in multiple languages by generating textual translated segments in the note language based on the original audio segments and generating the note variations in the multiple languages based on such. Such technique may oppose performing a translation of the note that is in a default language and further translating the latest translation into additional variations, which may cause loss of content accuracy.

The system may include one or more hardware processors configured by machine-readable instructions. The machine-readable instructions may include one or more instruction components. The instruction components may include computer program components. The instruction components may include one or more of audio obtaining component, translation performance component, presentation effectuation component, note population component, language determination component, and/or other instruction components.

The audio obtaining component may be configured to obtain, in an ongoing manner, individual audio segments that represent sounds captured by a client computing platform during a conversation session between a caregiver and a subject. The caregiver may speak primarily in a caregiver language and the subject may speak primarily in a subject language that is different than the caregiver language. The audio segments may include caregiver audio segments that represent sound conveying utterances by the caregiver during the conversation session, and subject audio segments that represent sound conveying utterances by the subject during the conversation session.

The translation performance component may be configured to perform, upon obtainment of individual ones of the audio segments, a first translation on the individual audio segments to generate individual translated segments so that the caregiver audio segments are translated to the subject language and the subject audio segments are translated to the caregiver language.

The translation performance component may be configured to effectuate, via the client computing platform, presentation of the individual translated segments extemporaneous with the conversation session to facilitate understanding between the caregiver and the subject. The translation performance component may be configured to perform a second translation on the audio segments based on a note language to determine content blocks in the note language.

The note population component may be configured to populate at least some of a note with the content blocks. The note may document the conversation session. The note may be in the note language.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
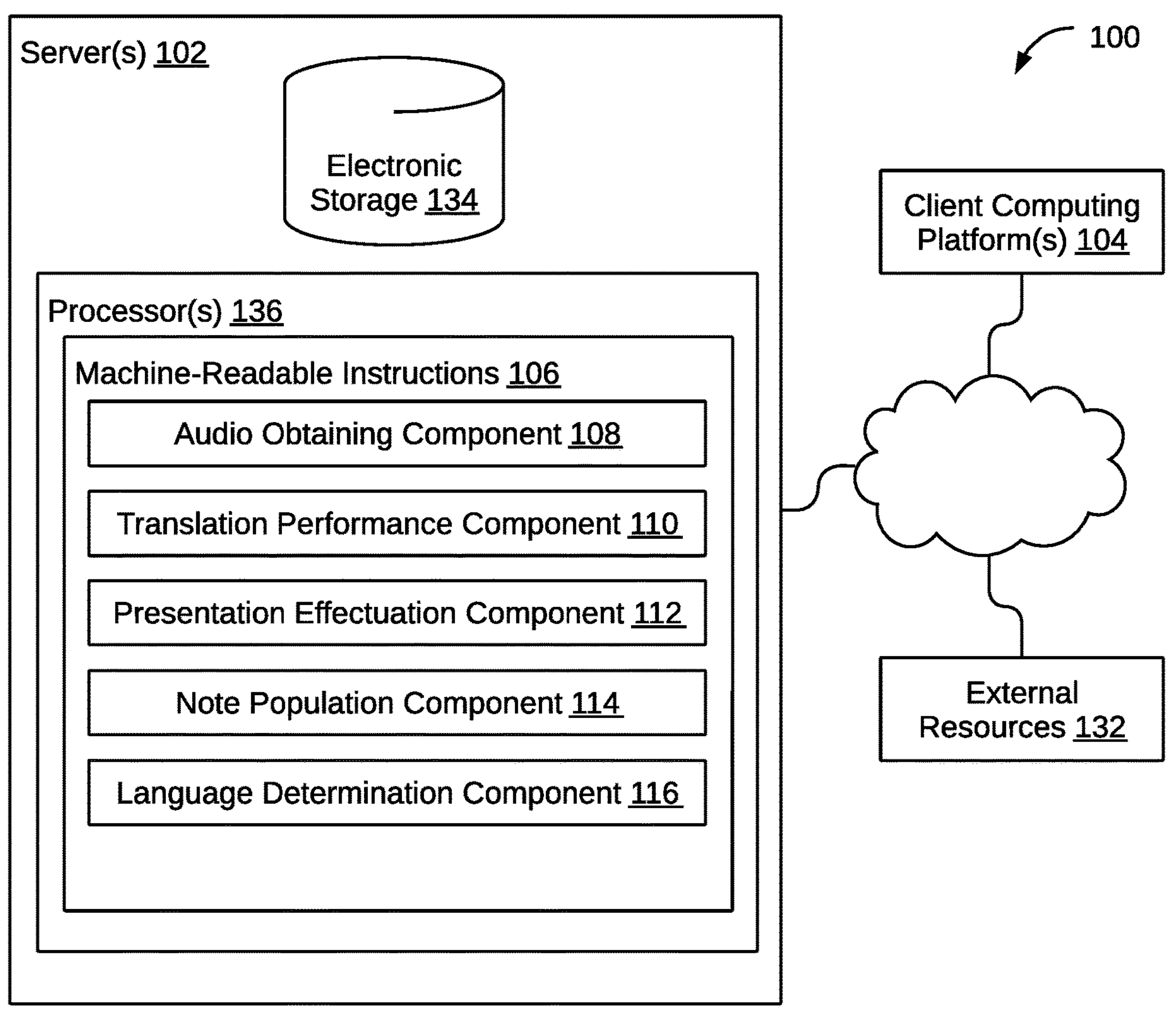
FIG. 1 illustrates a system configured to generate a note based on utterances in different languages during a conversation session, and effectuate translation segments extemporaneous to the conversation session to facilitate understanding between participants of the conversation session, in accordance with one or more implementations.

FIG. 1 illustrates a system 100 configured to generate a note based on utterances in different languages during a conversation session, and effectuate translation segments extemporaneous to the conversation session to facilitate understanding between participants of the conversation session, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Client computing platform 104 may include a presentation device, a user interface, audio output device, an audio input device, and/or other components. The presentation device may be a screen on client computing platform 104 (e.g., a screen of a tablet), a monitor of a computer, a television screen (e.g., connected to client computing platform 104), a projector, and/or other presentation devices that are configured to visually present content.

The user interface may include the user interface elements. The user interface elements may be configured to facilitate user entry and/or selection. An individual user interface element may be configured to be selected or manipulated by the users to provide one or more selections, initiate capturing sounds, terminate capturing of the sounds, suspending capturing of the sounds, select a language a language spoken by one or more participants in a conversation session, among other user input. By way of non-limiting illustration, the user interface elements may include one or more of buttons (e.g., keyboard, mouse), switches, a trackpad, a touchscreen, text input fields, virtual drop down menus, virtual check boxes, virtual display windows, virtual buttons, and/or other user interface elements. Voice commands may be captured by client computing platform 104. The voice commands may convey the same user interface user entry and/or selection with an utterance by the user.

The audio output device may be configured to generate sound based on audio segments. The audio output device may include one or more speakers, one or more headsets, and/or other audio output devices. The audio input device may be configured to capture sounds and provide the audio segments that represent such sounds to processor(s) 136.

Electronic storage 134 may store note types, notes for subjects, and/or other information. Individual ones of the note types may include different combinations of one or more sections and/or one or more parameter classes. Individual ones of the note types may include one or more note sections. By way of non-limiting example, the note sections may include synopsis of the subject, prescriptions, illnesses and conditions, symptoms, diagnoses, and/or other note sections. In some implementations, a note type may be customized by a user to include particular ones of the note sections and/or new note sections.

A parameter class may cause population of a corresponding parameter and placeholder in a given note upon selection of one of the note types that includes the parameter class. A parameter may be a measurable, recordable, and/or determined information. The placeholder may be a space or symbol in place of a parameter value that defines the parameter with regard to the subject. The parameter value corresponding to the parameter may be a particular value, numerical or non-numerical, that characterizes the subject. In some implementations, the parameter value may include a unit of measure. In some implementations, the parameter value may not be related to a unit of measure. In some implementations, the unit of measure may be implied and predetermined given the parameter. A note may be populated with the parameter and placeholder based on the parameter class upon selection of the note type that includes the parameter class. In some implementations, some or all of the individual parameter classes may include the individual parameters and individual corresponding default parameter values. Thus, the parameters and corresponding default parameter values may be populated in the note in response to selection of a note type that includes default parameter values. In some implementations, the default parameter values may remain in the note or the user may modify such default parameter values via the audio information.

The parameter value(s) populated for the parameter may record individual assessments and/or measurements of the parameters taken with respect to the subject such that the parameter values of the parameters define the state of the subject. By way of non-limiting example, the parameters may include height, weight, heart rate, blood pressure, color, and/or other parameters. In some implementations, the one or more parameters may be related to the note section included in. In some implementations, the one or more parameters may be its own note section.

Server(s) 102 may be configured by machine-readable instructions 106. Machine-readable instructions 106 may include one or more instruction components. The instruction components may include computer program components. The instruction components may include one or more of audio obtaining component 108, translation performance component 110, presentation effectuation component 112, note population component 114, language determination component 116, and/or other instruction components.

Audio obtaining component 108 may be configured to obtain, in an ongoing manner, individual audio segments. The term "ongoing manner" as used herein may refer to continuing to perform an action (e.g., obtain) periodically (e.g., every 30 seconds, every minute, every hour, etc.) until receipt of an indication to terminate. The indication to terminate may include silence that follows individual ones of the utterances from the different participants, a change in language detected, a change in the participant speaking detected, and/or user input via user interface elements (e.g., selecting a virtual button), and/or other indications of termination. The individual audio segments may represent sounds captured by client computing platform 104 during a conversation session between a caregiver, a subject, and/or other participants. The conversation session may be about the subject and/or other topic. It is to be understood that the participants including the caregiver and the subject are for exemplary purposes only and are not intended to be limiting.

The caregiver may speak primarily in a caregiver language and the subject may speak primarily in a subject language that is different than the caregiver language. In some implementations, other participants in the conversation session may speak other languages that are different than the caregiver language and the subject language, or the same as one of the caregiver language and the subject language. The caregiver language, the subject language, and other language described herein may be any language (e.g., English, Spanish, Portuguese, Japanese, etc.) and is not intended to be limiting to particular languages. The audio segments may include caregiver audio segments that represent sound conveying utterances by the caregiver during the conversation session, and subject audio segments that represent sound conveying utterances by the subject during the conversation session, and/or other audio segments that represent sound conveying utterances by other participants during the conversation session.

The audio segments may include digital audio signals that encode sounds of individual utterances of the participants, a recording of the individual utterances of the participants, and/or other audio information. In some implementations, the sounds conveying the utterances of the participants may be detected by the audio input device, such as a microphone, of client computing platform 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. In some implementations, audio obtaining component 108 may be configured to generate the audio segments based on the sounds in response to silence that follows individual ones of the utterances from the different participants, a change in language detected, a change in the participant speaking detected, and/or user input via the user interface elements (e.g., selecting a virtual button). In some implementations, the silence may be for a particular amount of time that may be fixed or modifiable by users (e.g., the caregivers). In some implementations, the audio segments may be stored in electronic storage 134 in association with the subject.

In some implementations, language determination component 116 may be configured to determine the caregiver language based on the caregiver audio segments. Moreover, language determination component 116 may be configured to determine the subject language based on the subject audio segments, and/or other languages spoken by other participants based on other ones of the audio segments. Such determinations may be completed by performing novel or known techniques for detecting a language spoken based on the audio segments. In some implementations, determining the caregiver language and the subject language may be based on receiving user input via client computing platform 104 that specifies the caregiver language, the subject language, and/or other languages spoken by other ones of the participants. In some implementations, language determination component 116 may be configured to determine the caregiver language, the subject language, and/or other languages spoken by other participants based on textualized segments that represent the audio segments described herein.

Translation performance component 110 may be configured to perform a first translation on the individual audio segments to generate individual translated segments. The first translation may be performed upon obtainment of individual ones of the audio segments. As such, the caregiver audio segments may be translated to the subject language, and the subject audio segments may be translated to the caregiver language.

In some implementations, performing the first translation may include performing, upon obtainment of the individual audio segments, speech recognition on the individual audio segments to generate individual textualized segments. The speech recognition performed may be known and/or novel techniques. The textualized segments may be textual representations of the utterances by the respective participants in their spoken languages so that they may be read, stored in electronic storage 134, utilized for generating content blocks to populate in notes, and/or other utilizations. The textualized segments may include caregiver textualized segments, subject textualized segments, and/or other textualized segments. As such, the caregiver textualized segments may be generated based on the caregiver language and the caregiver audio segments. Furthermore, the subject textualized segments may be generated based on the subject language and the subject audio segments.

Subsequently, performing the first translation may further include translating, upon generation of the individual textualized segments, the individual textualized segments based on the subject language and the caregiver language to generate individual translated segments intended for the subject, the caregiver, or other participant. The translated segments may be variations of the textualized segments that are in different languages than the textualized segments (and the corresponding audio segments) that they are based on, and intended for another participant in the conversation session to understand. The translated segments may include subject-intended translated segments, caregiver-intended translated segments, and/or other translated segments. As such, for example, the caregiver textualized segments may be translated to the subject-intended translated segments (that are in the subject language), and the subject textualized segments may be translated to the caregiver-intended translated segments (that are in the caregiver language).

In some implementations, the first translation may include generating the translated segments directly from the audio segments, i.e., without generating the textualized segments first. That is, for example, the subject-intended translated segments may be generated based on the caregiver audio segments, and the caregiver-intended translated segments may be generated based on the subject audio segments. In some implementations, the first translation may be performed by employing one or more novel and/or known translation techniques that generate textualized segments in a first language based on audio segments that are in a second language that is different than the first language and/or other textualized segments in the second language.

Translation performance component 110 may be configured to effectuate presentation of the individual translated segments extemporaneous with the conversation session to facilitate understanding between the caregiver, the subject, and/or other participants. Meaning, as the individual translated segments are generated, they are immediately presented via client computing platform 104 so that the participant that the individual translated segments are intended for may view the translated segment and understand the other participants during the conversation session. Presentation of the individual translated segments may be via client computing platform 104. Such presentation may be via the presentation device.

In some implementations, the participant that the individual translated segments are intended for may be presented via client computing platforms 104 or presentation devices associated with each of the participants. That is, the individual participants may only be presented the translated segments intended for them and that represent the utterances of the other participants to facilitate their understanding of the other participants.

In some implementations, the first translation may include generating translated audio segments based on the audio segments originally obtained. The translated audio segments may be variations of the originally obtained audio segments, but in a different language than the audio segments (and the corresponding textualized segments) that they are based on, and thus the translated audio segments are intended for another participant in the conversation session to hear and understand.

The translated audio segments may include subject-intended audio segments, caregiver-intended audio segments, and/or other audio segments intended for other participants. As such, for example, the caregiver audio segments may be translated to the subject-intended audio segments, and the subject audio segments may be translated to the caregiver-intended audio segments. In some implementations, generating the translated audio segments may be based on the translated segments that are textual. In some implementations, the first translation may be performed by employing one or more novel and/or known translation techniques that generate audio segments in the first language based on the audio segments that are in the second language and/or other textualized segments in the second language.

In some implementations, the translated audio segments may be audibly played via the audio output device in addition to presented of the translated segments via client computing platform(s) 104. In some implementations, the translated audio segments may be audibly played via the audio output device alterative to presentation of the translated segments.

In some implementations, translation performance component 110 may be configured to perform a second translation on the audio segments based on a note language to determine content blocks in the note language. The note language may be the language that the note is to be generated in. In some implementations, the note language may be the same as or different than the caregiver language. In some implementations, the note language may be the same as or different than the subject language, or other languages of other participants. In some implementations, performing the second translation may include providing the textualized segments that represent the audio segments, the note language, the audio segments, the languages of the participants, an electronic medical record of the subject, one of the note types that the note is based on, and/or other information to a machine learning model. Electronic storage 134 may store electronic medical records for the subjects including the electronic medical record for the subject. In some implementations, such information may be included in a model prompt that is provided or otherwise transmitted to the machine learning model. Performing the second translation may include generating the model prompt responsive to obtainment of the audio segments and/or generation of the textualized segments. The machine learning model may be configured to generate content blocks in the note language based on the textualized segments, the note language, and/or other information. As such, the model prompt may request the machine learning model to generate the content blocks in the note language.

In some implementations, language determination component 116 may be configured to receive, via client computing platform 104, the note language. For example, the caregiver may interact with the user interface elements to provide the note language. In some implementations, language determination component 116 may be configured to determine the note language based on a dictation from the caregiver, other participants, or other user alternative to or in addition to interacting with the user interface elements.

In some implementations, note population component 114 may be configured to receive, via client computing platform 104, a selection of one of the note types that is a basis for generating the note. The note may be a digital document that includes information about the subject and their visit or procedure, or otherwise may document the conversation session. The note may be structured or organized into one or more of the note sections based on the selected note type. In some implementations, receiving the selection of the note type may include receiving a spoken selection via the voice commands, or receiving the user input via the user interface elements. In some implementations, receiving the selection of the note type may include determining the note type by analyzing the textualized segments, the audio segments, the translated segments, and/or other information.

In some implementations, note population component 114 may be configured to effectuate, via client computing platform 104, presentation of a prompt that requests specification of one of the note types for the note. In some implementations, the prompt may be presented responsive to the user input requesting to access the note. In some implementations, the prompt may be presented responsive to receipt of a termination indication to terminate capturing all the sounds via client computing platform 104. That is, subsequent to concluding the conversation session and the user providing the voice command or the user input via the user interface elements to terminate the capturing of the sounds, the prompt may be presented to request specification of the one of the note types. By way of non-limiting example, the note may be generated based on the note type so that the note includes a first combination of the one or more sections, one or more parameters and corresponding placeholders.

The machine learning model may generate individual ones of the content blocks related to individual topics based on the information provided (e.g., the model prompt). The topics may correspond to or may be related to the note sections that are included in the different note types. For example, a topic may be the subject's complaints which may be related to a Symptoms note section. Individual ones of the content blocks may include a textualized summary of portions of the textualized segments, and/or the audio segments related to a topic in the note language. Meaning, the portions of the textualized segments and/or the audio segments that are related to a given topic, regardless of where in such information, are summarized and included in the textualized summary in the note language. For example, the subject may utter complaints (i.e., Symptoms) at various points during the conversation session. All the complaints may be summarized into a single textualized summary included in a content block in the note language.

In some implementations, the machine learning model may be a large language model. In some implementations, the machine learning model may be stored in electronic storage 134. In some implementations, the machine learning model may be stored and executed by external resources 132. For example, the machine learning model may be a third party service employed by system 100.

In some implementations, the large language model may be Transformer-based which has been previously trained on a plurality of generic information to generate output text based on the information received. The large language model may be Encoder-Decoder based with a plurality of model parameters where the large language model is trained on a variety of language tasks. The large language model may utilize both the Encoder and Decoder components of the architecture during training. The Decoder may only be used for generation the output text. In some implementations, the large language model may be fine-tuned on specific training information or open-source clinical information, which may improve the quality of the generated content blocks described herein.

In some implementations, the machine learning model may be a custom Encoder-Decoder based Transformer model that may be used to receive text as input to the Encoder. The Encoder may generate high-dimensional representations of the input text, which is utilized by the Decoder to generate appropriate content blocks.

Note population component 114 may be configured to obtain the content blocks from the machine learning model. In some implementations, obtainment of the content blocks may be via a network that server(s) 102 and the machine learning model are connected through. In some implementations, obtainment of the content blocks may be within server(s) 102 upon the machine learning model being stored in electronic storage 134. In some implementations, note population component 114 may be configured to establish the connection with the machine learning model via the network.

Note population component 114 may be configured to populate at least some of the note with the content blocks. In some implementations, populating at least some of the note with the content blocks may be based on the note type selected indicating the sections and/or the parameters to be included in the note, other information in electronic storage 134, and/or other information obtainable by note population component 114. In some implementations, the content blocks populated in the note may facilitate with the caregiver's understanding of the utterances by the subject and/or other participants that are not the caregiver.

Population may further include effectuating presentation of the content blocks in relevant ones of the one or more sections of the note via client computing platform 104. Relevancy may be based on the one or more sections of the note and the topics that the content blocks are related to. Presentation of the content blocks may include addition options that are selectable by the caregiver to confirm addition or deny addition of individual ones of the content blocks in the sections.

The addition options may be the user interface elements, such as virtual buttons, to accept or deny addition of the individual the content blocks in the structured note under the note sections that they were populated under via the user input. That is, the content blocks may not officially be populated in the note to store a finalized note that is accessible by the subject or other users until the caregiver (or other authorized users such as a nurse) provides the user input to accept the addition of the content block or deny the addition of the content block. In some implementations, the user input provided by the caregiver may move the content block to a different note section than it was populated under. Subsequent user input provided may accept and confirm the addition of the content block under the different note section, or deny population in the note entirely.

In some implementations, note population component 114 may be configured to store the note in electronic storage 134 upon population of at least some of the note. In some implementations, the finalized note, subsequent to accepting or denying addition of all the content blocks, may be stored in electronic storage 134. The note may be stored in association with the subject.

In some implementations, presentation effectuation component 112 may be configured to effectuate presentation of the note via client computing platform 104. Presentation of the note may be subsequent to generation of the note or upon requesting access to the note from electronic storage 134.

In some implementations, translation performance component 110 may be configured to receive, via a secondary client computing platform 104, a request to generate a new note translation of the note. Secondary client computing platform 104 may be different than client computing platform 104 that was used during the conversation session. In some implementations, secondary client computing platform 104 may have the same access and abilities as client computing platform 104. In some implementations, secondary client computing platform 104 may be associated with the subject or other third party user. The new note translation may be a variation of the note in a different language than the note language. The request may include a supplemental language that the new note translation is to be generated in. For example, the new note translation may be the subject language, i.e., the supplemental language.

In some implementations, translation performance component 110 may be configured to perform a third translation on the note based on the note language, the supplemental language, and/or other information to generate the new note translation. In some implementations, performing the third translation may include directly translating the note that is in the note language to the supplemental language to generate the new note translation. Such translation may be performed by employing known and/or novel translation techniques and/or models.

In some implementations, performing the third translation may be similar to that of the second translation described herein but based on the supplemental language as opposed to the note language, and/or other information. That is, a second model prompt that includes the supplemental language, the textualized segments, the audio segments, the languages of the participants, the electronic medical record, the note type that the note is based on, and/or other information may be generated and provided to the machine learning model. In response to the second model prompt, the machine learning model may output supplemental content blocks in the supplemental language. Subsequently, note population component 114 may be configured to obtain the supplemental content blocks and populate the supplemental content blocks in the new note translation.

In some implementations, individual ones of the note types may correspond with language counterpart note types in the different languages. Individual language counterpart note types may include the same sections and/or parameters as the corresponding note types, but in the different languages. Thus, in some implementations, populating the supplemental content blocks in the new note translation may be based on the language counterpart note type that is in the supplemental language and associated with the note type.

In some implementations, translation performance component 110 may be configured to effectuate presentation of the new note translation via secondary client computing platform 104. In some implementations, translation performance component 110 may be configured to transfer the new note translation to secondary client computing platform 104. In some implementations, translation performance component 110 may be configured to store the new note translation to electronic storage 134.

Figure 3:
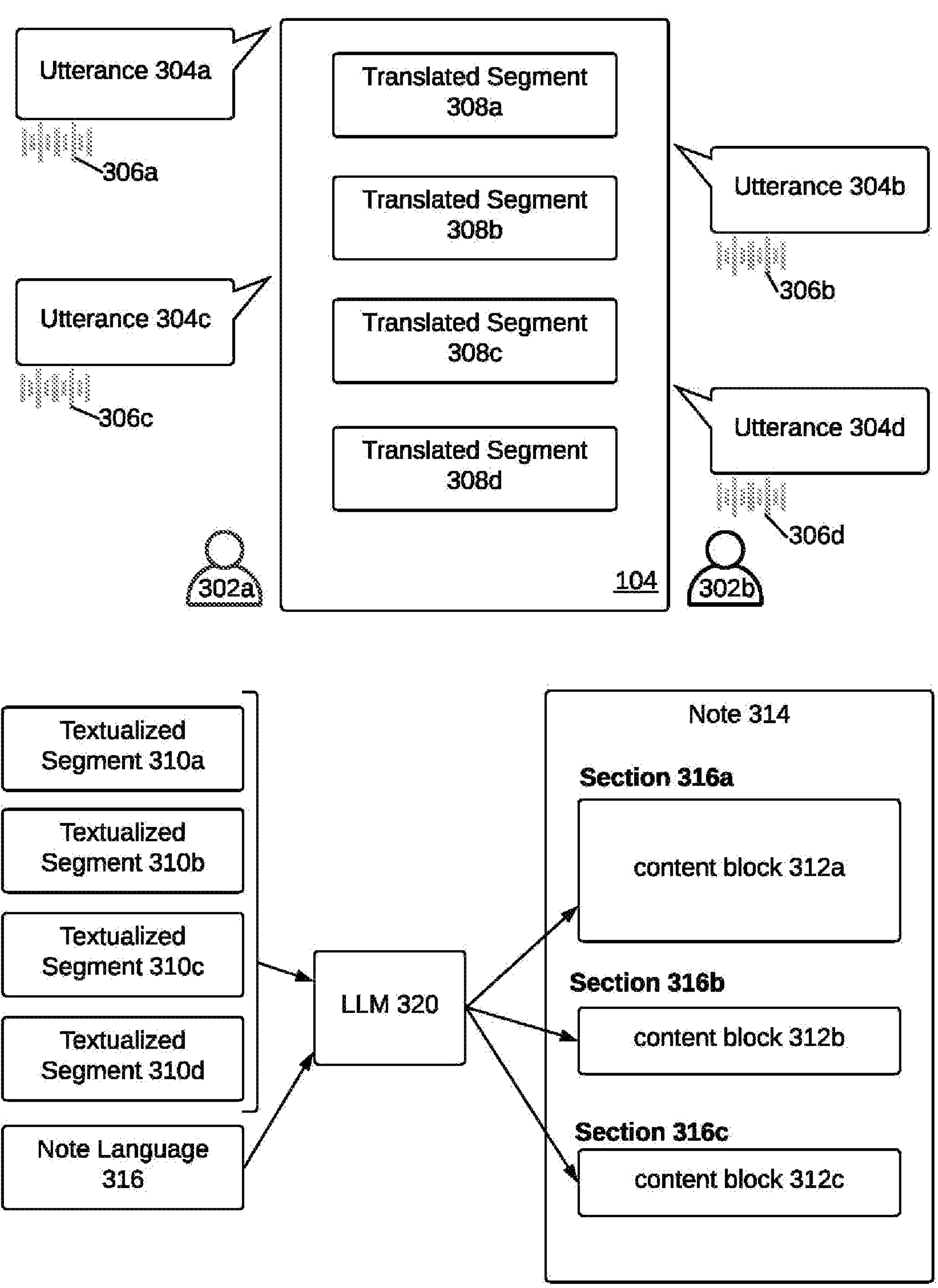
FIG. 3 illustrates an example implementation of the system configured to generate a note based on utterances in different languages during a conversation session, and effectuate translation segments extemporaneous to the conversation session to facilitate understanding between participants of the conversation session, in accordance with one or more implementations.

FIG. 3 illustrates client computing platform 104 referred to in FIG. 1. Client computing platform 104 may be present and used during a conversation session between a caregiver 302*a* that speaks caregiver language and a subject 302*b* that speaks a subject language that is different than the caregiver language. Caregiver 302*a* may provide utterance 304*a* that is represented by caregiver audio segment 306*a*. Based on caregiver audio segment 306*a*, translated segment 308*a* in the subject language may be generated and presented via client computing platform 104 to facilitate understanding of the caregiver by the subject. Subject 302*b* may provide utterance 304*b* that is represented by subject audio segment 306*b*. Based on subject audio segment 306*b*, translated segment 308*b* in the caregiver language may be generated and presented via client computing platform 104 to facilitate understanding of the subject by the caregiver.

Similarly, caregiver 302*a* may provide utterance 304*c* that is represented by caregiver audio segment 306*c*. Based on caregiver audio segment 306*c*, translated segment 308*c* in the subject language may be generated and presented via client computing platform 104. Subject 302*b* may provide utterance 304*d* that is represented by subject audio segment 306*d*. Based on subject audio segment 306*d*, translated segment 308*d* in the caregiver language may be generated and presented via client computing platform 104.

Based on audio segments 306*a-d*, corresponding textualized segments 310*a*-310*d*, respectively, may be generated. Based on at least textualized segments 310*a-d* and a note language 316 input to a large language model (LLM) 320, LLM 320 may output content blocks 312*a-c*. Content blocks 312*a-c* may be populated in a note 314 for subject 302*b* under appropriate sections 316*a-c*, respectively, so that note 314 is in note language 316. Note 314 may be presented via client computing platform 104 for caregiver 302*a* or other care providers to view and/or modify.

Referring back to FIG. 1, in some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 108, 110, 112, 114, and/or 116, and/or other components. Processor(s) 136 may be configured to execute components 108, 110, 112, 114, and/or 116, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 136 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112,

114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 136 may be configured to execute one or more additional components that may perform some or all of the functionality attributed below to one of components 108, 110, 112, 114, and/or 116.

Figure 2:
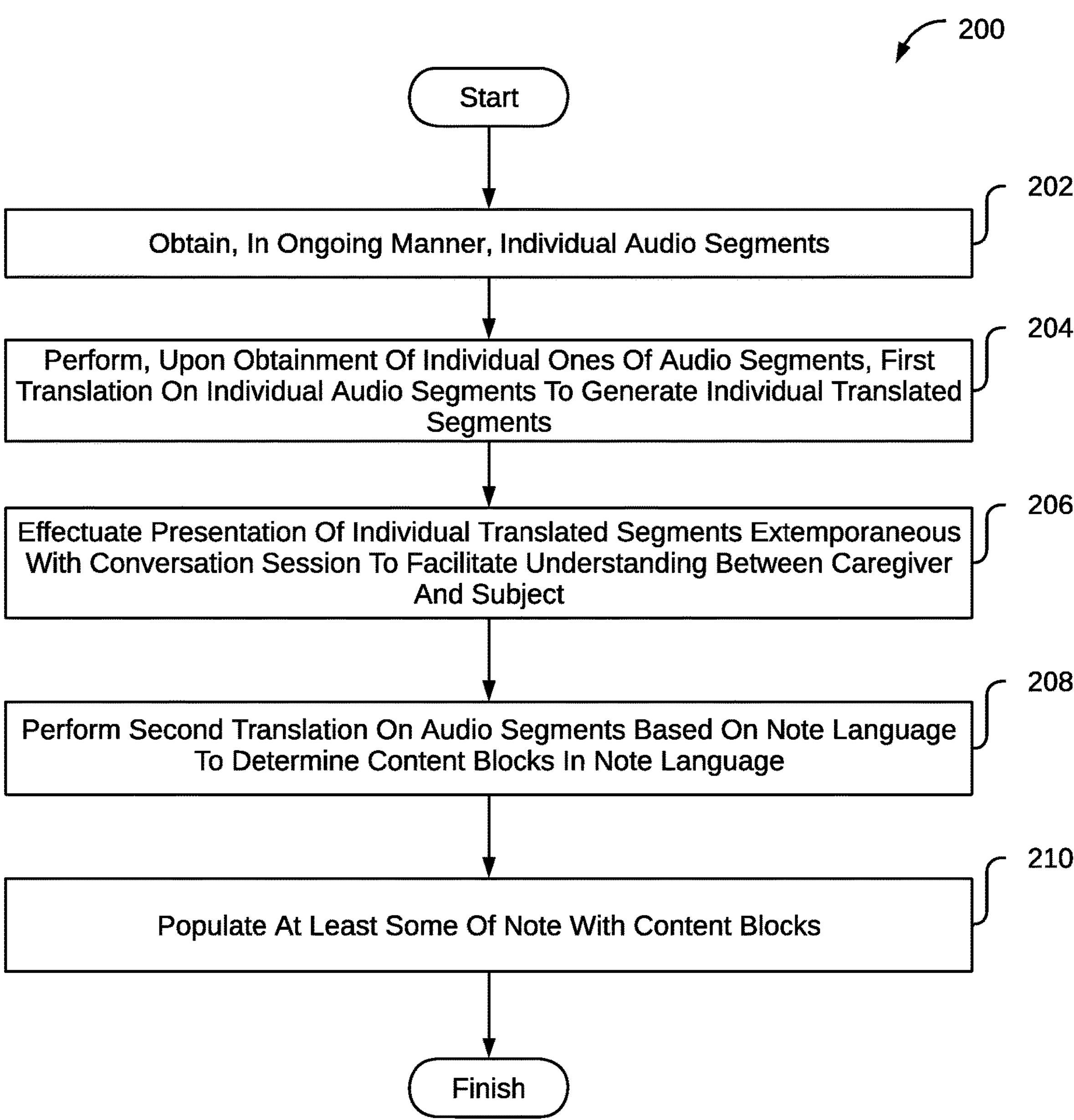
FIG. 2 illustrates a method to generate a note based on utterances in different languages during a conversation session, and effectuate translation segments extemporaneous to the conversation session to facilitate understanding between participants of the conversation session, in accordance with one or more implementations.

FIG. 2 illustrates a method 200 to generate a note based on utterances in different languages during a conversation session, and effectuate translation segments extemporaneous to the conversation session to facilitate understanding between participants of the conversation session, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining, in an ongoing manner, individual audio segments that represent sounds captured by a client computing platform during a conversation session between a caregiver and a subject, in which the caregiver speaks primarily in a caregiver language and the subject speaks primarily in a subject language that is different than the caregiver language. The audio segments may include caregiver audio segments that represent sound conveying utterances by the caregiver during the conversation session, and subject audio segments that represent sound conveying utterances by the subject during the conversation session. Operation 202 may be performed by one or more hardware processors configured by machine-readable instructions including a component that is the same as or similar to audio obtaining component 108, in accordance with one or more implementations.

An operation 204 may include performing, upon obtainment of individual ones of the audio segments, a first translation on the individual audio segments to generate individual translated segments so that the caregiver audio segments are translated to the subject language and the subject audio segments are translated to the caregiver language. Operation 204 may be performed by one or more hardware processors configured by machine-readable instructions including a component that is the same as or similar to translation performance component 110, in accordance with one or more implementations.

An operation 206 may include effectuating presentation of the individual translated segments extemporaneous with the conversation session to facilitate understanding between the caregiver and the subject. Operation 206 may be performed by one or more hardware processors configured by machine-readable instructions including a component that is the same as or similar to translation performance component 110, in accordance with one or more implementations.

An operation 208 may include performing a second translation on the audio segments based on a note language to determine content blocks in the note language. Operation 208 may be performed by one or more hardware processors configured by machine-readable instructions including a component that is the same as or similar to translation performance component 110, in accordance with one or more implementations.

An operation 210 may include populating at least some of a note with the content blocks. The note may document the conversation session. The note may be in the note language. Operation 210 may be performed by one or more hardware processors configured by machine-readable instructions including a component that is the same as or similar to note population component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate a note based on utterances in different languages, the system comprising:

electronic storage storing definitions of note types, wherein individual ones of the note types include different combinations of one or more sections and/or one or more parameter classes, wherein a parameter class causes population of a corresponding parameter and placeholder in notes upon selection of one of the note types that includes the parameter class; and one or more processors configured by machine-readable instructions to:

obtain, in an ongoing manner, individual audio segments that represent sounds captured by a client computing platform during a conversation session between a caregiver and a subject in which the caregiver speaks primarily in a caregiver language and the subject speaks primarily in a subject language that is different than the caregiver language, wherein the audio segments include:

caregiver audio segments that represent sound conveying utterances by the caregiver during the conversation session, and subject audio segments that represent sound conveying utterances by the subject during the conversation session;

perform, upon obtainment of individual ones of the audio segments, a first translation on the individual audio segments to generate individual translated segments so that the caregiver audio segments are translated to the subject language and the subject audio segments are translated to the caregiver language;

effectuate, via the client computing platform, presentation of the individual translated segments extemporaneous with the conversation session to facilitate understanding between the caregiver and the subject;

perform a second translation on the audio segments based on a note language to determine content blocks in the note language;

populate at least some of a note with the content blocks, wherein the note documents the conversation session, wherein the note is in the note language;

receive, via the client computing platform, a selection of a note type from the note types for the note, wherein the note is generated based on the note type so that the note includes a first combination of the one or more sections, one or more parameters and corresponding placeholders; and wherein populating at least some of the note includes:

effectuating, via the client computing platform, presentation of the content blocks in relevant ones of the one or more sections of the note, wherein presentation of the content blocks includes addition options that are selectable by the caregiver to confirm addition or deny addition of individual ones of the content blocks.

2. The system of claim 1, wherein the one or more processors are further configured by the machine-readable instructions to:

effectuate presentation of the note via the client computing platform.

3. The system of claim 1, wherein the one or more processors are further configured by the machine-readable instructions to:

receive, via a secondary client computing platform, a request to generate a new note translation of the note, wherein the request includes a supplemental language;

perform a third translation on the note based on the note language and the supplemental language to generate the new note translation; and effectuate presentation of the new note translation via the secondary client computing platform.

4. The system of claim 1, wherein the one or more processors are further configured by the machine-readable instructions to:

store the note in the electronic storage upon population of at least some of the note.

5. The system of claim 1, wherein the one or more processors are further configured by the machine-readable instructions to:

receive, via the client computing platform, the note language.

6. The system of claim 1, wherein the one or more processors are further configured by the machine-readable instructions to:

determine the caregiver language based on the caregiver audio segments; and determine the subject language based on the subject audio segments.

7. The system of claim 6, wherein determining the caregiver language and the subject language is based on receiving user input via the client computing platform that specifies the caregiver language and the subject language.

8. A system configured to generate a note based on utterances in different languages, the system comprising:

one or more processors configured by machine-readable instructions to:

obtain, in an ongoing manner, individual audio segments that represent sounds captured by a client computing platform during a conversation session between a caregiver and a subject in which the caregiver speaks primarily in a caregiver language and the subject speaks primarily in a subject language that is different than the caregiver language, wherein the audio segments include:

caregiver audio segments that represent sound conveying utterances by the caregiver during the conversation session, and subject audio segments that represent sound conveying utterances by the subject during the conversation session;

perform, upon obtainment of individual ones of the audio segments, a first translation on the individual audio segments to generate individual translated segments so that the caregiver audio segments are translated to the subject language and the subject audio segments are translated to the caregiver language;

effectuate, via the client computing platform, presentation of the individual translated segments extemporaneous with the conversation session to facilitate understanding between the caregiver and the subject;

perform a second translation on the audio segments based on a note language to determine content blocks in the note language; and populate at least some of a note with the content blocks, wherein the note documents the conversation session, wherein the note is in the note language; and wherein performing the first translation includes:

performing, upon obtainment of the individual audio segments, speech recognition on the individual audio segments to generate individual textualized segments so that:

caregiver textualized segments are generated based on the caregiver language and the caregiver audio segments, and subject textualized segments are generated based on the subject language and the subject audio segments, wherein the textualized segments include the caregiver textualized segments and the subject textualized segments, and translating, upon generation of the individual textualized segments, the individual textualized segments based on the subject language and the caregiver language to generate the individual translated segments intended for the subject or the caregiver so that:

the caregiver textualized segments are translated to subject-intended translated segments, and the subject textualized segments are translated to caregiver-intended translated segments, wherein the translated segments include subject-intended translated segments and the caregiver-intended translated segments.

9. The system of claim 8, wherein the one or more processors are further configured by the machine-readable instructions to:

store the note in electronic storage upon population of at least some of the note.

10. The system of claim 8, wherein the one or more processors are further configured by the machine-readable instructions to:

receive, via the client computing platform, the note language.

11. A method to generate a note based on utterances in different languages, the method comprising:

managing definitions of note types stored in electronic storage, wherein individual ones of the note types include different combinations of one or more sections and/or one or more parameter classes, wherein a parameter class causes population of a corresponding parameter and placeholder in notes upon selection of one of the note types that includes the parameter class;

obtaining, in an ongoing manner, individual audio segments that represent sounds captured by a client computing platform during a conversation session between a caregiver and a subject in which the caregiver speaks primarily in a caregiver language and the subject speaks primarily in a subject language that is different than the caregiver language, wherein the audio segments include:

caregiver audio segments that represent sound conveying utterances by the caregiver during the conversation session, and subject audio segments that represent sound conveying utterances by the subject during the conversation session;

performing, upon obtainment of individual ones of the audio segments, a first translation on the individual audio segments to generate individual translated segments so that the caregiver audio segments are translated to the subject language and the subject audio segments are translated to the caregiver language;

effectuating, via the client computing platform, presentation of the individual translated segments extemporaneous with the conversation session to facilitate understanding between the caregiver and the subject;

performing a second translation on the audio segments based on a note language to determine content blocks in the note language;

populating at least some of a note with the content blocks, wherein the note documents the conversation session, wherein the note is in the note language;

receiving, via the client computing platform, a selection of a note type from the note types for the note, wherein the note is generated based on the note type so that the note includes a first combination of the one or more sections, one or more parameters and corresponding placeholders; and wherein the populating of the at least some of the note includes:

effectuating presentation of the content blocks in relevant ones of the one or more sections of the note via the client computing platform, wherein presentation of the content blocks includes addition options that are selectable by the caregiver to confirm addition or deny addition of individual ones of the content blocks.

12. The method of claim 11, further comprising:

effectuating presentation of the note via the client computing platform.

13. The method of claim 11, further comprising:

receiving, via a secondary client computing platform, a request to generate a new note translation of the note, wherein the request includes a supplemental language;

performing a third translation on the note based on the note language and the supplemental language to generate the new note translation; and effectuating presentation of the new note translation via the secondary client computing platform.

14. The method of claim 11, further comprising:

storing the note in the electronic storage upon population of at least some of the note.

15. The method of claim 11, further comprising:

receiving, via the client computing platform, the note language.

16. The method of claim 11, further comprising:

determining the caregiver language based on the caregiver audio segments; and determining the subject language based on the subject audio segments.

17. The method of claim 16, wherein determining the caregiver language and the subject language is based on receiving user input via the client computing platform that specifies the caregiver language and the subject language.

18. A method to generate a note based on utterances in different languages, the method comprising:

obtaining, in an ongoing manner, individual audio segments that represent sounds captured by a client computing platform during a conversation session between a caregiver and a subject in which the caregiver speaks primarily in a caregiver language and the subject speaks primarily in a subject language that is different than the caregiver language, wherein the audio segments include:

caregiver audio segments that represent sound conveying utterances by the caregiver during the conversation session, and subject audio segments that represent sound conveying utterances by the subject during the conversation session;

performing, upon obtainment of individual ones of the audio segments, a first translation on the individual audio segments to generate individual translated segments so that the caregiver audio segments are translated to the subject language and the subject audio segments are translated to the caregiver language;

effectuating, via the client computing platform, presentation of the individual translated segments extemporaneous with the conversation session to facilitate understanding between the caregiver and the subject;

performing a second translation on the audio segments based on a note language to determine content blocks in the note language;

populating at least some of a note with the content blocks, wherein the note documents the conversation session, wherein the note is in the note language; and wherein the performing of the first translation includes:

performing, upon obtainment of the individual audio segments, speech recognition on the individual audio segments to generate individual textualized segments so that:

caregiver textualized segments are generated based on the caregiver language and the caregiver audio segments, and subject textualized segments are generated based on the subject language and the subject audio segments, wherein the textualized segments include the caregiver textualized segments and the subject textualized segments, and translating, upon generation of the individual textualized segments, the individual textualized segments based on the subject language and the caregiver language to generate the individual translated segments intended for the subject or the caregiver so that:

the caregiver textualized segments are translated to subject-intended translated segments, and the subject textualized segments are translated to caregiver-intended translated segments, wherein the translated segments include subject-intended translated segments and the caregiver-intended translated segments.

19. The method of claim 18, further comprising: storing the note in electronic storage upon population of at least some of the note.

20. The method of claim 18, further comprising: receiving, via the client computing platform, the note language.

* * * * *